United States Patent
Lang et al.

(10) Patent No.: US 9,826,679 B2
(45) Date of Patent: Nov. 28, 2017

(54) FILAMENT CUTTERHEAD FOR A BRUSHCUTTER

(71) Applicant: Andreas Stihl AG & Co. KG, Waiblingen (DE)

(72) Inventors: Sven Lang, Esslingen (DE); Achim Rethaber, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 120 days.

(21) Appl. No.: 14/957,251

(22) Filed: Dec. 2, 2015

(65) Prior Publication Data

US 2016/0081268 A1   Mar. 24, 2016

(30) Foreign Application Priority Data

Dec. 23, 2014 (DE) .................. 10 2014 019 548

(51) Int. Cl.
*A01D 34/416* (2006.01)
(52) U.S. Cl.
CPC ................ *A01D 34/4166* (2013.01)
(58) Field of Classification Search
CPC ...................... A01D 34/4166; Y10T 29/49826
See application file for complete search history.

(56) References Cited

U.S. PATENT DOCUMENTS

| | | | | |
|---|---|---|---|---|
| 4,571,831 A | * | 2/1986 | White, III | A01D 34/416 30/276 |
| 5,359,777 A | * | 11/1994 | Bauer | A01D 34/416 30/276 |
| 6,263,580 B1 | | 7/2001 | Stark et al. | |
| 7,581,322 B2 | * | 9/2009 | Proulx | A01D 34/4163 30/276 |
| 7,797,839 B2 | | 9/2010 | Proulx | |
| 7,882,642 B2 | | 2/2011 | Proulx | |
| 9,516,807 B2 | * | 12/2016 | Alliss | A01D 34/4163 |
| 2004/0134078 A1 | | 7/2004 | Pfaltzgraff | |
| 2007/0130781 A1 | | 6/2007 | Iacona | |
| 2011/0302793 A1 | | 12/2011 | Alliss | |
| 2016/0081268 A1 | * | 3/2016 | Lang | A01D 34/4166 30/276 |
| 2017/0094900 A1 | * | 4/2017 | Arnetoli | A01D 34/4166 |

FOREIGN PATENT DOCUMENTS

EP   3 036 984 A1 * 12/2015

* cited by examiner

*Primary Examiner* — Hwei C Payer
(74) *Attorney, Agent, or Firm* — Walter Ottesen, P.A.

(57) ABSTRACT

A filament cutterhead is provided for mounting on the drive shaft of a brushcutter. The filament cutterhead includes a housing with a circumferential wall wherein a first wall opening for a cutting filament is formed. A filament spool arranged in the housing is rotatable relative to the housing. A filament channel with a filament inlet segment is provided in a partition wall of the filament spool. The filament channel extends from the filament inlet segment past the hub to a filament outlet segment which is assigned a second wall opening in the circumferential wall. The filament outlet segment is at an offset (v) with respect to the filament inlet segment in the circumferential direction of the hub. The mouth of the filament inlet segment and the mouth of the filament outlet segment lie within an outside diameter (A) of the partition wall and open into a pass-through space.

20 Claims, 12 Drawing Sheets

FILAMENT CUTTERHEAD FOR A BRUSHCUTTER

CROSS REFERENCE TO RELATED APPLICATION

This application claims priority of German patent application no. 10 2014 019 548.1, filed Dec. 23, 2014, the entire content of which is incorporated herein by reference.

BACKGROUND OF THE INVENTION

U.S. Pat. No. 6,263,580 discloses a filament cutterhead with a filament spool, in which, in a predetermined rotational position, a cutting filament can be inserted through a wall opening in the circumferential wall of the housing and can be coiled up by manual rotation of the filament spool. The cup-shaped housing has a first wall opening and a second wall opening in the circumferential wall for each cutting filament to be wound up. The filament spool has a hub on which a disk-shaped partition wall is arranged. The partition wall divides the filament spool into a first upper winding section and a second lower winding section, wherein a filament-guiding filament channel is formed in the partition wall, into which the cutting filament to be coiled up can be inserted via a filament-guiding filament inlet portion. The filament inlet portion has a longitudinal central axis which runs on a radial through the axis of rotation of the hub and, in the predetermined rotational position of the filament spool, runs through the wall opening in the circumferential wall of the housing.

In order to coil up a cutting filament, the end portion of a cutting filament is inserted into each wall opening, wherein the filament channel deflects the cutting filament by 90° and clamps same. As a result, when the filament spool is rotated, the cutting filament is drawn into the housing and coiled up onto an associated winding section of the filament spool.

In order to wind a new cutting filament onto a filament spool, a cutting filament has to be inserted through each wall opening, which is complicated. It has to be ensured here during the winding-up operation that the two inserted cutting filament ends are securely grasped and at the same time wound up.

SUMMARY OF THE INVENTION

It is an object of the invention to configure a filament cutterhead for a brushcutter in such a manner that the insertion and the winding up of the cutting filament are simplified and functionally reliable.

The filament-guiding filament channel is guided from the filament-guiding filament inlet portion at a wall opening past the hub as far as an opposite filament-guiding filament outlet portion in the edge of the partition wall of the filament spool. The filament-guiding filament outlet portion is assigned a further wall opening in the circumferential wall of the housing. The construction here is provided in such a manner that the filament-guiding filament outlet portion has a lateral offset with respect to the longitudinal central axis of the filament-guiding filament inlet portion in the plane of the partition wall—with respect to the circumferential direction of the hub. The mouth of the filament inlet portion and the mouth of the filament outlet portion lie here within the outside diameter of the partition wall and merge into a through space in which the filament does not have a guide laterally. The lateral-guide-free through space lies between a mouth and the outside diameter of the partition wall.

By means of this configuration of the filament channel, the user is provided with the possibility, in a predetermined rotational position of the filament spool, of pushing a cutting filament end portion, which is inserted from the outside through the filament passage opening, through the guide-free through space and of inserting same into the filament inlet portion of the filament channel. By further pushing-in of the cutting filament, the end portion is advanced along the filament-guiding filament channel and will emerge from the filament-guiding filament outlet portion, will pass through the further through space without a guide and will emerge outward through the further wall opening. The user can then grasp the emerging end portion of the cutting filament and can position the cutting filament to be coiled up such that an approximately identical length of the cutting filament protrudes from the two wall openings. By manual rotation of the filament spool counter to the unwinding direction, the cutting filament lengths protruding from the diametrically opposite wall openings are then wound up onto the winding sections of the filament spool until an end portion necessary for cutting use protrudes from the wall openings.

Since the cutting filament to be wound up is not divided and is coiled up from the central portion of the cutting filament through the two wall openings, a simultaneous, error-free coiling up of the cutting filament is ensured, which ensures trouble free functioning of the filament cutterhead during operation.

In an embodiment of the invention, the filament inlet portion and/or the filament outlet portion are/is configured as a rectilinear channel portion. The longitudinal central axis of the filament inlet portion and a longitudinal central axis of the filament outlet portion lie at a distance from each other in the plane of the partition wall.

In a particular embodiment of the invention, the mouth of the filament inlet portion and the mouth of the filament outlet portion each have a center, wherein a first radial runs from the axis of rotation of the hub through the center of the mouth of the filament inlet portion, and a second radial runs from the axis of rotation of the hub through the center of the mouth of the filament outlet portion. The wall openings lie on an imaginary connecting line through the axis of rotation of the hub, which connecting line connects the longitudinal central axes of the wall openings to each other. An inlet angle, lying between the first radial and the connecting line, at the filament inlet portion is formed unequally to an outlet angle, which is formed between the second radial and the connecting line, at the filament outlet portion. The construction is advantageously configured in such a manner that the inlet angle is configured to be smaller than the outlet angle. In a particular embodiment, the inlet angle is configured at zero in such a manner that the first radial from the axis of rotation of the hub through the center of the mouth of the filament inlet portion lies on the imaginary connecting line through the axis of rotation of the hub, which connecting line connects the longitudinal central axes of the wall openings to each other.

As seen in the circumferential direction of the hub, the through space is configured to be wider than the width, as measured in the same direction, of the mouth of the filament inlet portion and of the filament outlet portion. The filament inlet portion and the filament outlet portion are preferably connected to each other by a curved channel portion in the plane of the partition wall, wherein the bending radius of the curved channel portion is greater than the inside radius of the hub of the filament spool.

In a preferred embodiment of the invention, a second filament channel is provided with a second filament inlet portion and a second filament outlet portion. The second filament channel runs in the partition wall of the filament spool from the second further wall opening as far as the first wall opening. In the plane of the partition wall, the hub of the filament spool lies between the filament channels.

The filament outlet portion of the one filament channel and the filament inlet portion of the other filament channel lie next to each other upstream of a wall opening in the circumferential direction of the partition wall.

In the plane of the partition wall, in addition to the filament inlet portion of a filament channel, a filament assist outlet of the same filament channel can be provided, wherein a longitudinal central axis of the filament assist outlet lies in particular parallel to the longitudinal central axis of the filament inlet portion. The filament assist outlet can be formed by a rectilinear channel portion of the filament channel.

In a particular embodiment, the filament inlet portion and the channel portion of the filament assist outlet merge via a common channel extension into the filament channel.

In an embodiment of the invention, each filament channel can have a filament inlet portion at one and the same wall opening, that is, a cutting filament can be pushed into the one or the other filament channel at each wall opening. The imaginary elongation of the longitudinal central axis of the filament inlet portion can run here through the wall opening in the circumferential wall of the housing. In a particular embodiment of the invention, the filament inlet portion of the first filament channel and the filament inlet portion of the second filament channel within the housing of the filament cutterhead can form a common central inlet upstream of a wall opening. A central inlet of this type merges into the filament channels advantageously via a channel junction and a deflector, that is, is connected both to the one filament channel and to the other filament channel.

A guide bushing with a filament passage opening is preferably held in the wall opening, wherein the guide bushing is configured with a catch contour on the inner side thereof that faces the edge of the partition wall. The catch contour expediently has an opening width which covers at least one filament inlet portion and one filament outlet portion. The catch contour is bounded by two longitudinal ribs which run in the vertical direction of the hub and protrude almost as far as the edge of the partition wall.

The inner wall of the filament passage opening in the guide bushing is preferably configured as a double cone which extends inward and outward.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
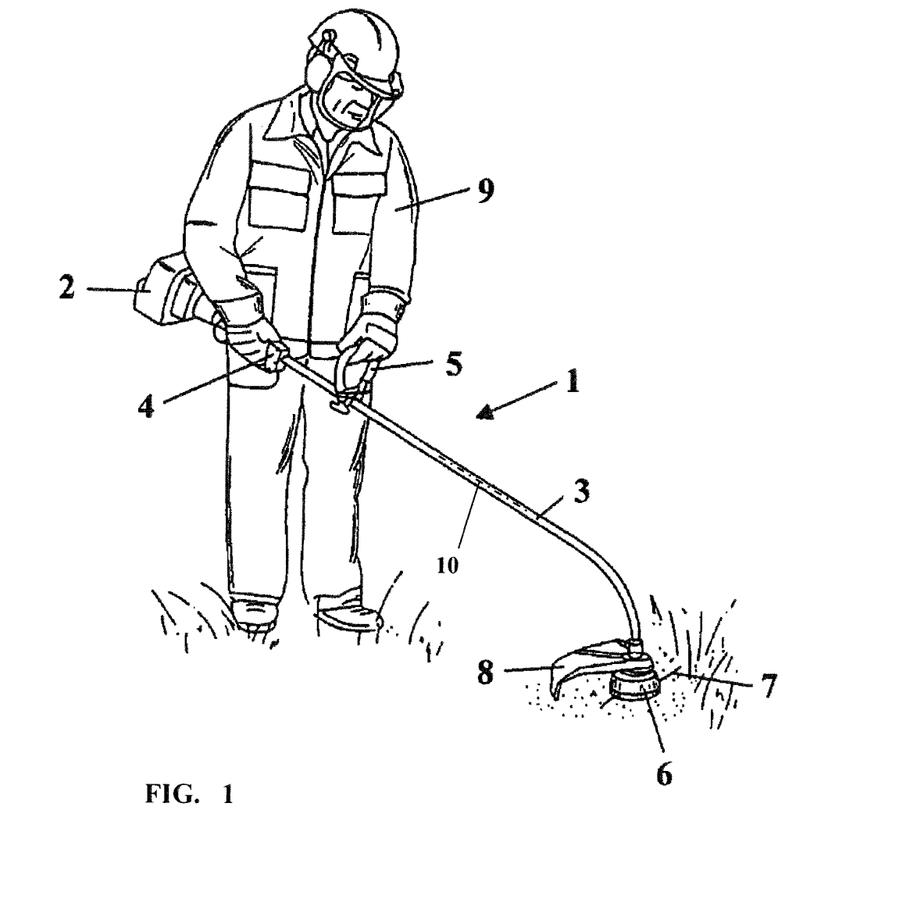
FIG. 1 is a schematic showing a brushcutter with a fitted filament cutterhead.
Figure 2:
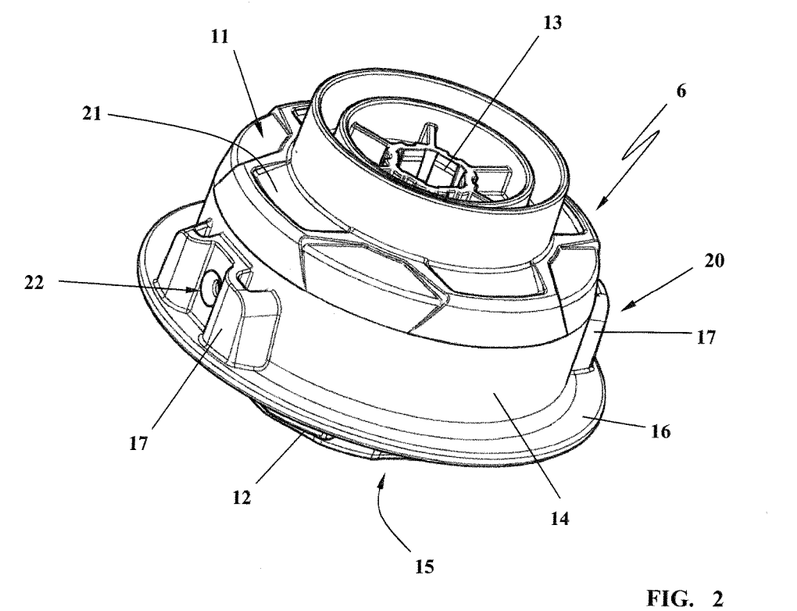
FIG. 2 is a perspective view of a filament cutterhead for mounting on the drive shaft of a brushcutter.
Figure 3:
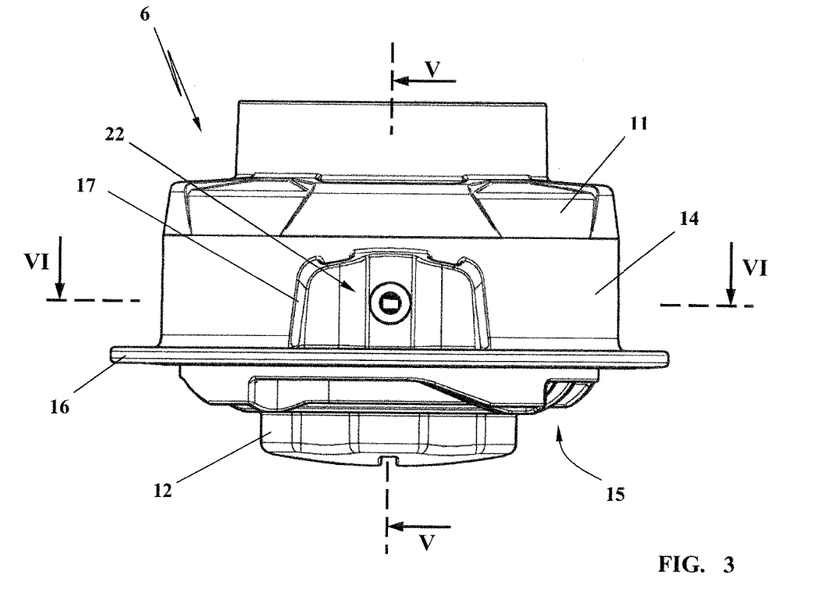
FIG. 3 is a view of the filament cutterhead according to FIG. 2.

FIG. 1 shows, by way of example, a brushcutter 1 which essentially comprises a guide tube 3, at the one end of which a drive motor 2 and at the other end of which a filament cutterhead 6 are mounted. The brushcutter has a first handle 4 with operating elements for the drive motor 2; a bale handle 5 is mounted between the handle 4 and the filament cutterhead 6 such that a user 9 can carry and guide the brushcutter via the handle 4 and the bale handle 5. The filament cutterhead 6 is connected to the drive motor 2 via a drive shaft 10. If a curved guide tube 3 is used—as shown in the embodiment—the drive shaft is a flexible drive shaft; alternatively, the guide tube can be a rectilinear guide tube, and therefore the drive shaft 10 can be configured as a rigid shaft.

The filament cutterhead 6 is mounted on the drive shaft 10 and is driven in a rotating manner by the latter. The ends of a cutting filament 7, which serves as cutting tool, protrude from the housing of the filament cutterhead 6. An impact guard 8 is mounted in order to protect the user 9 and the surroundings.

A mixture-lubricated two-stroke engine, a mixture-lubricated four-stroke engine or an electric motor can be used as drive motor 2.

The filament cutterhead 6, which is illustrated by way of example in FIG. 1, can differ in configuration. FIGS. 2 to 8 show a first embodiment; FIGS. 9 to 16 show a second embodiment.

The filament cutterhead 6 illustrated in FIGS. 2 to 8 essentially comprises a cup-shaped housing 11 which can be closed by a closure cover 12. The housing 11 has a connection contour 13 for the form-fitting connection to the drive shaft 10; the circumferential wall 14 of the housing 11 has a protruding, encircling outer flange 16 in the region of the lower opening 15 thereof. Wall openings 20 and 22 are provided—lying diametrically opposite each other—in the circumferential wall 14, which is preferably of cylindrical configuration. The wall openings (20, 22) serve for the passage of the cutting filament 7 which is stored within the housing 11.

In order to protect the cutting filament 7, a support structure 17, which is intended to prevent breakage of the cutting filament 7 in the region of the wall opening (20, 22) if the cutting filament strikes against an obstacle, is provided on the circumferential wall 14.

Figure 4:
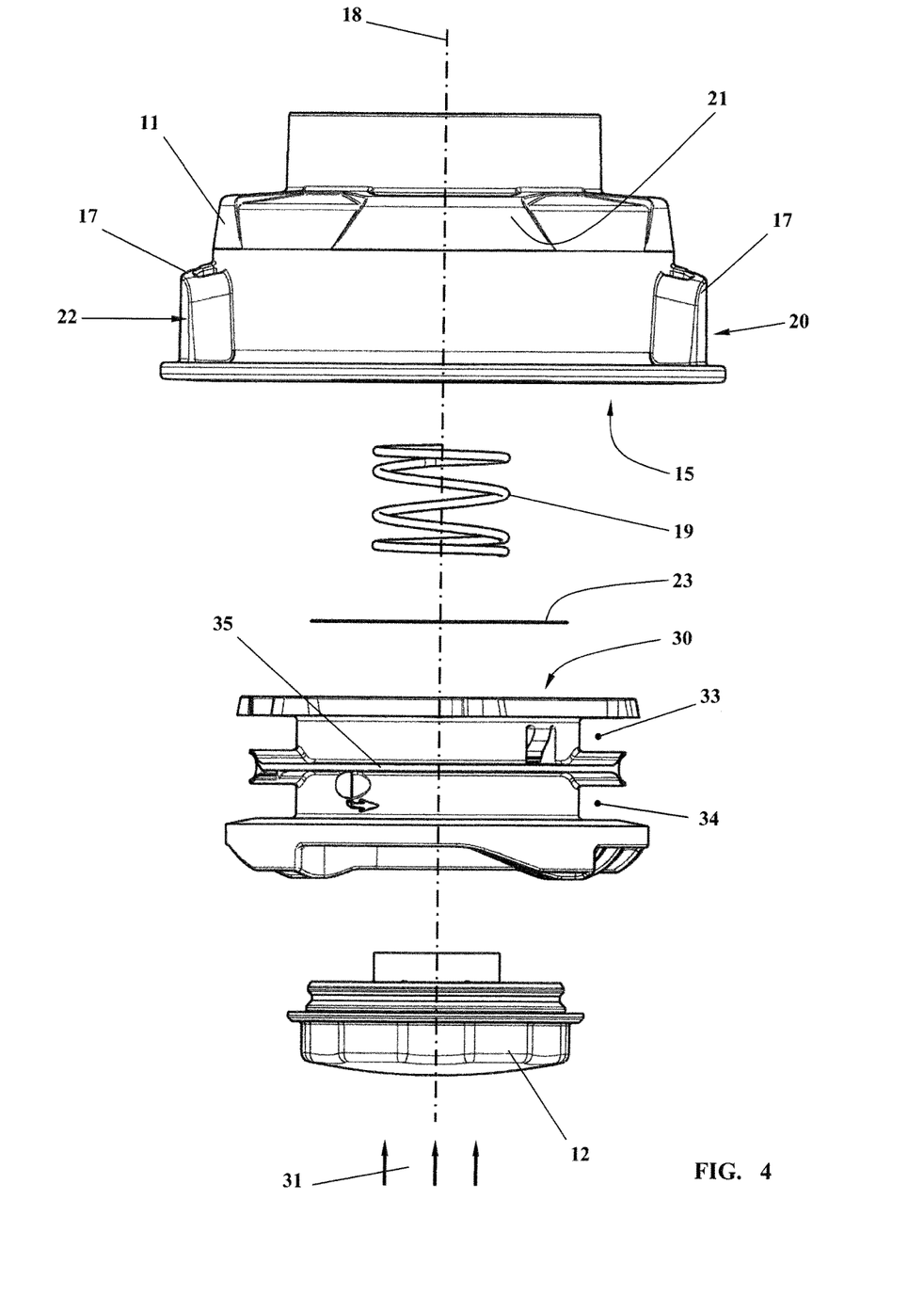
FIG. 4 shows an exploded view with the essential components of the filament cutterhead according to FIG. 2.

FIG. 4 reproduces the essential components of the filament cutterhead in an exploded view. The housing 11 is driven in a rotating manner about the axis of rotation 18 by the drive shaft 10. A filament spool 30 arranged in the housing 11 is driven in a rotating manner together with the housing 11 via an entraining contour of the dogs 26. A helical spring 19 is supported on the base 21 of the housing 11 and acts via a pressure disc 23 on the filament spool 30. The latter is inserted through the opening 15 into the housing 11 counter to the force of the helical spring 19 and is fixed in the housing by the closure cover 12. If a force is exerted on the closure cover 12 in the arrow direction 31, the filament spool 30 is displaced axially within the housing by a distance (w) counter to the force of the helical spring 19. The driving connection between the housing 11 and the filament spool 30 is then briefly interrupted, and therefore the driven housing 11 is rotated relative to the filament spool 30 and uncoils the cutting filament wound up on the filament spool 30. The cutting filament emerges outward through the wall openings 20 and 22, and therefore a sufficient length of the cutting filament 7 (FIG. 1) is available as a cutting element. The principle of the driving connection between housing 11 and filament spool 30 is described in detail in the applicant's U.S. Pat. No. 6,263,580 which is incorporated herein by reference.

Figure 5:
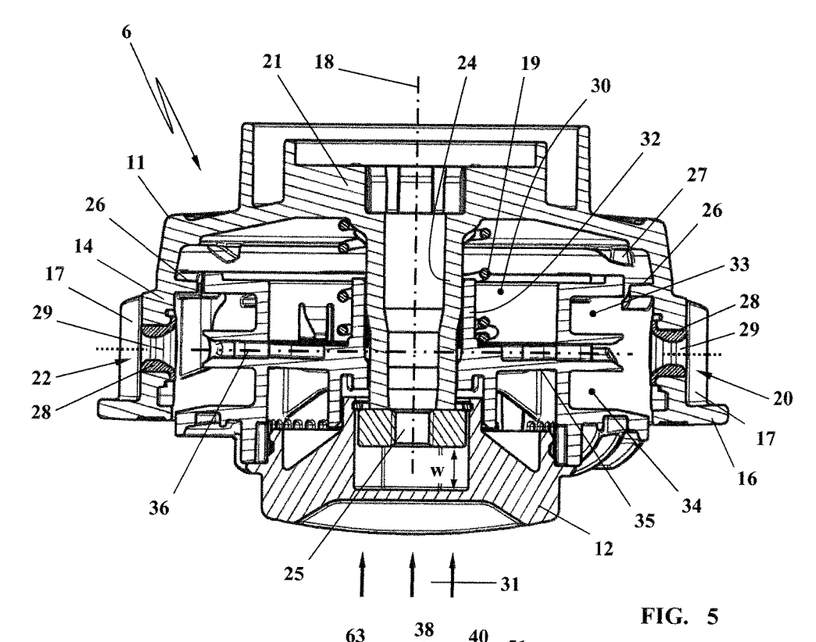
FIG. 5 shows a section through the filament cutterhead along the line V-V in FIG. 3.
Figure 6:
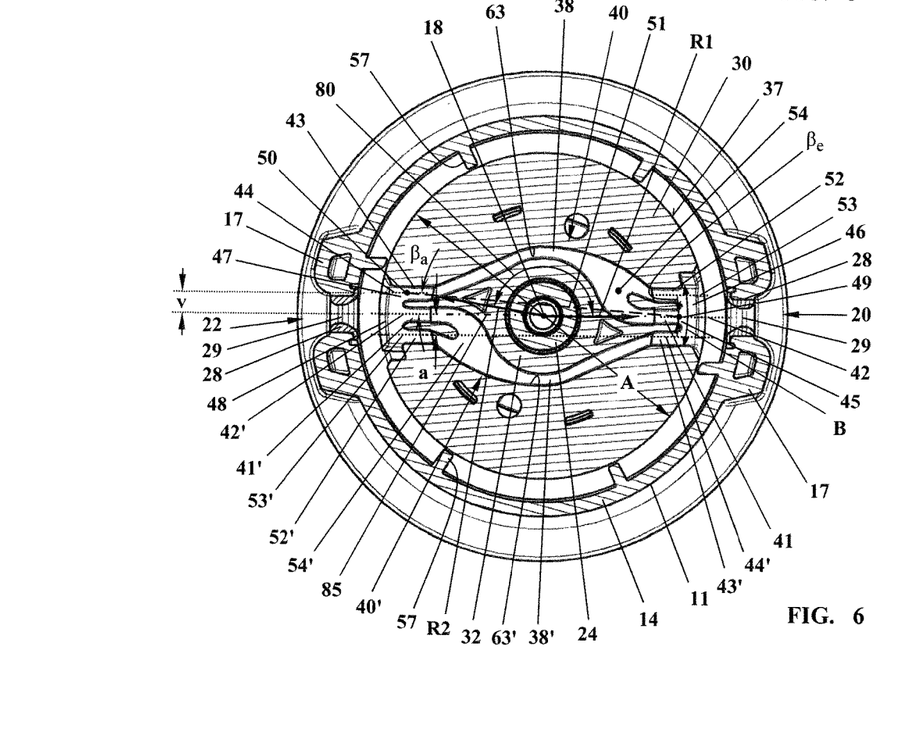
FIG. 6 shows a section through the filament cutterhead along the line VI-VI in FIG. 3.

The configuration of the filament cutterhead 6 is apparent in particular from FIGS. 5 and 6. The cup-shaped housing 11 with the base 21 and the circumferential wall 14 with the terminating outer flange 16 has a central connection sleeve 24 for receiving the end (not illustrated specifically in FIG. 5) of the drive shaft 10. The closure cover 12 is screwed onto the threaded end 25 of the drive shaft, as a result of which the housing 11 is held fixedly on the drive shaft 10 (FIG. 1). The closure cover 12 is displaceable here axially by the distance (w).

The closure cover 12 holds the filament spool 30 within the housing 11, with the helical spring 19 acting between the base 21 and the filament spool 30. The helical spring 19 presses the filament spool 30 and the closure cover 12 into the operating position which is shown in FIG. 5 and in which, via dogs 26, the filament spool 30, which is held rotatably on the connection sleeve 24, is entrained in a rotating manner about the axis of rotation 18 in the direction of rotation together with the housing 11 via the dogs 26.

If, by means of the action of force in the arrow direction 31, the closure cover 12 is displaced inwardly together with the filament spool 30 counter to the force of the helical spring 19, the rotational connection with the dogs 26 is interrupted, as a result of which the rotatingly driven housing 11 can rotate relative to the filament spool 30. The rotational movement is controlled by cams of an advancing device 27. After the force acting in the arrow direction 31 ceases, the helical spring 19 presses the filament spool 30 downward again, wherein the dogs 26 enter into engagement again with the filament spool 30, and therefore the driving rotational connection between the housing 11 and the filament spool 30 is restored.

The filament spool 30, which is held in a rotating manner on the connection sleeve 24, is rotatable relative to the housing 11, for which purpose the filament spool 30 is mounted on the connection sleeve 24 by means of a hub 32.

Figure 7:
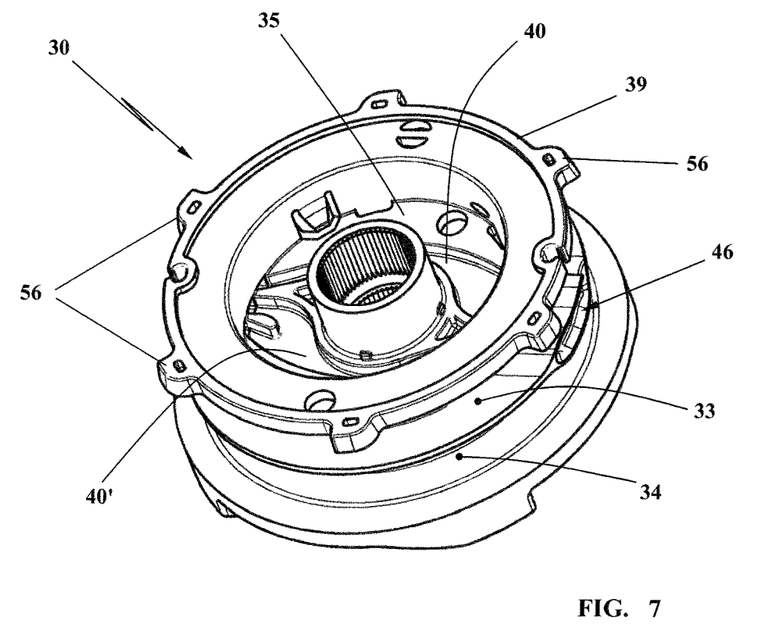
FIG. 7 is a perspective view of the filament spool of the filament cutterhead according to FIG. 2.
Figure 8:
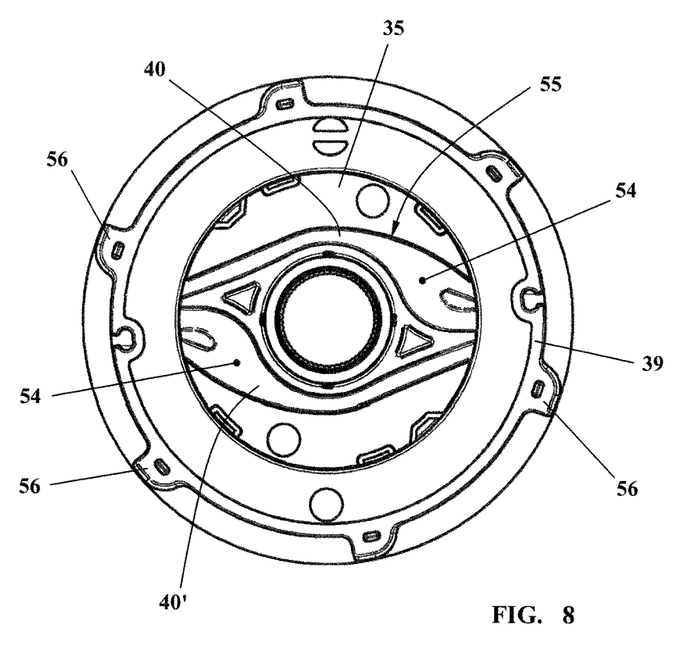
FIG. 8 shows a top plan view of the filament spool according to FIG. 7.

The filament spool 30 illustrated in FIGS. 7 and 8 essentially consists of the hub 32, on which winding sections 33 and 34 are formed. As FIG. 5 shows in conjunction with FIGS. 7 to 8, the hub 32 has a special central partition wall 35 which divides the filament spool 30 into a first winding section 33 and a second winding section 34. The first winding section 33 is an upper winding section and lies facing the base 21; the second winding section 34 is a lower winding section and lies facing the closure cover 12.

The partition wall 35 extends in a plane 36. The wall openings 20 and 22 are formed in the circumferential wall 14 at the elevation of plane 36 and these wall openings preferably lie diametrically opposite each other with respect to the axis of rotation 18. In the embodiment shown, a guide bushing 28, which ensures wear-free guidance of the cutting filament, is inserted into the wall opening 20 and 22. The guide bushings 28 have a central filament passage opening 29.

As the section view of FIG. 6 shows, a filament channel 40 which runs from the one first wall opening 20 to the second wall opening 22 is formed in the partition wall 35. The filament channel 40 is preferably formed exclusively in the partition wall 35 and has a filament-guiding filament inlet portion 41, the longitudinal central axis 42 of which lies on a radial R1 which runs through the axis of rotation 18 of the hub 32. In a predetermined rotational position of the filament spool 30 that is illustrated in FIG. 6, the imaginary elongation of the longitudinal central axis 42 of the filament inlet portion 41 runs through the wall opening 20 and through the filament passage opening 29 of the guide bushing 28. The central axis of the filament passage opening 29 and the longitudinal central axis 42 expediently lie coaxially with respect to each other.

As is furthermore shown in FIG. 6, the filament-guiding filament channel 40 leads from the filament-guiding filament inlet portion 41 past the hub 32 to an opposite filament-guiding filament outlet portion 43 in the edge of the partition wall 35. The filament-guiding filament outlet portion 43 is assigned the second wall opening 22 in the circumferential wall 14 of the housing 11. The filament-guiding filament outlet portion 43 has a longitudinal central axis 44. The longitudinal central axis 44 of the filament outlet portion 43 runs approximately parallel to the first radial R1 or to the longitudinal central axis 42 of the filament inlet portion 41. The longitudinal central axis 44 of the filament outlet portion 43 has a lateral offset (v) with respect to the longitudinal central axis 42 of the filament inlet portion 41—as seen in the circumferential direction of the hub 32; in the plane 36 of the partition wall 35, the longitudinal central axis 44 of the filament outlet portion 43 lies at a distance (a) from the longitudinal central axis 42 of the filament inlet portion 41.

The mouth 45 of the filament inlet portion 41 and the mouth 47 of the filament outlet portion 43 lie within an outside diameter A of the partition wall 35. The outside diameter A of the partition wall 35 is determined by the outer edge 37 of the partition wall.

The mouth 45 of the filament inlet portion 41 opens into a through space 46 in which the filament does not undergo any further guidance laterally; in a corresponding manner, the mouth 47 of the filament outlet portion 43 opens into a lateral-guide-free through space 48. The lateral-guide-free through space 46 or 48 lies within the outside diameter A of the partition wall 35. Furthermore, the lateral-guide-free through spaces 46 and 48 lie between the respective mouths 45 and 47 and the corresponding wall opening 20 and 22.

The filament inlet portion 41 and the filament outlet portion 43 are configured especially as rectilinear channel portions, wherein the longitudinal central axis 42 of the filament inlet portion 41 and the longitudinal central axis 44 of the filament outlet portion 43 lie with the lateral offset (v) with respect to each other—with respect to the circumferential direction of the hub 32—in the top view according to FIG. 6. In the embodiment shown, the longitudinal central axis 42 and the longitudinal central axis 44 are at a distance (a)—as measured in the plane 36 of the partition wall 35.

The mouth 45 of the filament inlet portion 41 has a center 49; in a corresponding manner, the mouth 47 of the filament outlet portion has a center 50. As shown in the top view according to FIG. 6, the connecting line 51 of the centers 49 and 50 runs laterally past the axis of rotation 18; the connecting line 51 of the centers 49 and 50 therefore does not intersect the axis of rotation 18 of the filament cutterhead.

The center 49 lies on a radial R1; the center 50 lies on a radial R2. The angle 80 spanned between the radials (R1, R2) is not equal to 180°; preferably, the angle 80 is less than 180°. In the embodiment shown, the angle 80 is between 165° and 178°.

FIG. 6 furthermore shows the first radial R1 which runs from the axis of rotation 18 of the hub 32 through the center 49 of the mouth 45 of the filament inlet portion 41. The radial R1 preferably lies on a connecting line 85 of the mutually opposite wall openings 20 and 22. The connecting line 85 runs through the axis of rotation 18 of the hub 32 and in particular connects the longitudinal central axes of the wall openings (20, 22) or the longitudinal central axes of the filament passage openings 29 to each other.

The second radial R2, which runs from the axis of rotation 18 of the hub 32 through the center 50 of the mouth 47 of the filament outlet portion 43, forms an outlet angle $\beta_a$ with the connecting line 85. In a corresponding manner, an inlet angle $\beta_e$ can be formed between the first radial R1 and the connecting line 85; the inlet angle $\beta_e$ is formed at zero in FIG. 6.

In order to obtain good filament guidance with easy insertion of the cutting filament to be wound up, provision is made to form the inlet angle $\beta_e$ not to be equal to the outlet angle $\beta_a$, in particular to form the inlet angle $\beta_e$ at zero. The outlet angle is preferably selected within the range of 2° to 12°, in particular within an angular range of 5° to 10°.

In the plane 36 of the partition wall 35, the through space (46, 48) has, in the circumferential direction of the hub 32, a width B which is configured to be wider than the width of the mouth 45 or 47, as measured in the same circumferential direction. As measured in the circumferential direction, the width B of the through space (46, 48) is many times wider than the mouth (45, 47); in the embodiment, two to three times wider than the mouth 45 or 47.

As FIGS. 6 and 8 show, the filament inlet portion 41 and the filament outlet portion 43 of the filament channel 40 are connected to each other by a curved channel portion 38 in the plane 36 of the partition wall 35. The bending radius of the curved channel portion 38 is greater here than the inner radius of the hub 32. In an advantageous embodiment of the invention, a second filament channel 40' is provided with a second filament inlet portion 41' and a second filament outlet portion 43'. The second filament channel 40' extends in the partition wall 35 of the filament spool 30 from the second wall opening 22 as far as the first wall opening 20. In the plane 36 of the partition wall 35, the hub 32 of the partition wall 35 lies between the filament channels 40 and 40'. The filament channel 40' is formed identically to the filament channel 40. The statements made above with respect to the filament channel 40 apply correspondingly to the filament channel 40'. Identical parts are identified by an identical reference character supplemented by a prime.

The filament outlet portion 43 of the first filament channel 40 and the filament inlet portion 41' of the second filament channel 40' lie next to each other in the circumferential direction of the partition wall 35 upstream of the wall opening 22. In a corresponding manner, the filament inlet portion 41 of the first filament channel 40 and the filament outlet portion 43' of the second filament channel 40' lie next to each other upstream of the wall opening 20, as seen in the circumferential direction of the partition wall 35.

It may be practical to provide a filament assist outlet 52 of the first filament channel 40 or a filament assist outlet 52' of the second filament channel 40' in addition to the filament inlet portion 41 or 41' in the plane 36 of the partition wall 35. A longitudinal central axis 53 or 53' of the filament assist outlet 52 or 52' lies parallel to the longitudinal central axis 42 or 42' of the filament inlet portion 41 or 41'. In a manner corresponding to the rectilinearly configured filament inlet portions (41, 41') or filament outlet portions (43, 43'), the filament assist outlet (52, 52') is also formed by a rectilinear channel portion of the filament channel 40 or 40'.

As FIG. 6 shows, the filament inlet portion 41 and the filament assist outlet 52 merge into the curved channel portion 38 of the filament channel 40 via a common channel extension 54. In a corresponding manner, the filament channel 40' has a channel extension 54'.

The illustrations of the filament spool according to FIGS. 7 and 8 show carry-along cams 56 which are uniformly distributed over the circumference on the upper edge 39 of the upper winding section 33, the entraining cams interacting with the dogs 26 of the housing 11 and ensuring the driving connection of the housing 11 on the filament spool 30 in the operating position according to FIG. 5.

In the embodiment shown, the filament channels 40 and 40' are provided as grooves 55 formed in a flat side of the partition wall 35; the pressure disk 23 illustrated in FIG. 4 rests on the flat side of the partition wall 35 and closes the grooves 55, as a result of which the filament channels (40, 40') are bounded on one side by the partition wall 35 and on the other side by the pressure disk 23.

In an advantageous embodiment of the filament cutterhead 30 according to the invention, longitudinal ribs 57 are provided on the inner side of the circumferential wall 14, the longitudinal ribs extending in the direction of the axis of rotation 18 and at least over part of the height of the filament receiving space, expediently over the height of the winding sections 33 and 34. The longitudinal ribs 57 reach radially as far as the edge 37 of the partition wall 35 without touching the latter. It is ensured by the longitudinal ribs 57 that the wound-up cutting filament cannot be shifted out of a winding section 33 or 34.

The filament cutterhead 6 can be provided with a new cutting filament without having to be opened. For this purpose, the filament spool 30 is rotated manually in the predetermined rotational position illustrated in FIG. 6, and the remainder of a used cutting filament is pulled radially out of the wall openings (20, 22); a new cutting filament is pushed in from the outside through the wall openings 20 or 22.

If the filament spool 30 is rotated into the predetermined rotational position shown in FIG. 6, the cutting filament is pushed in rectilinearly either through the wall opening 20 or through the wall opening 22. In the predetermined rotational position of the filament spool 30, a cutting filament inserted through the wall opening 20 is passed through the through space 46 in a manner free from guidance and will enter the filament inlet portion 41 of the filament channel via the mouth 45. The cutting filament is pushed in further axially, with the end of the cutting filament being advanced via the curved channel portion 38 to the filament outlet portion 43. The end of the cutting filament is guided on the outer wall 63 of the filament channel 40 and emerges via the mouth 47 into the free through space 48. Since the free end of the inserted cutting filament does not undergo any further guidance in the guide-free through space 48, the end, on striking against the edge region of the wall opening 22, on the guide bushing 28 in the wall region in the embodiment, will be aligned with the filament passage opening 29 and will emerge outward from the wall opening 22. The user can then grasp the filament end and position the cutting filament to be wound up such that an approximately identical length of the cutting filament protrudes from the two wall openings 20 and 22. The filament spool 30 can now be rotated counter to the unwinding direction, wherein, in the region of the filament inlet portion 41, the cutting filament is wound up, for example, into the upper winding section 34 and, in the region of the filament outlet portion 43, the cutting filament is wound up, for example, into the lower winding section 33. The filament spool 30 is rotated until an end portion sufficient for the cutting filament protrudes out of the wall openings 20 and 22.

If the cutting filament becomes worn, the driving connection between the housing 11 and the filament spool 30 is released by pressing the closure cover 12, and therefore the driven housing 11 can rotate more rapidly than the filament spool 30, as a result of which the cutting filament is unwound. It is ensured by means of the advancing device 27 (not described specifically) that a predetermined length of the cutting filament is uncoiled until the dogs 26 of the housing 11 enter into engagement again with the entraining cams 56 of the filament spool 30, and the filament spool 30 is driven together with the housing 11 by the drive shaft 10.

The embodiment of FIGS. 9 to 16 shows a filament cutterhead 106 which substantially corresponds in the basic configuration to the filament cutterhead 6 of FIGS. 2 to 8; identical parts are designated by reference numerals increased by 100.

Figure 9:
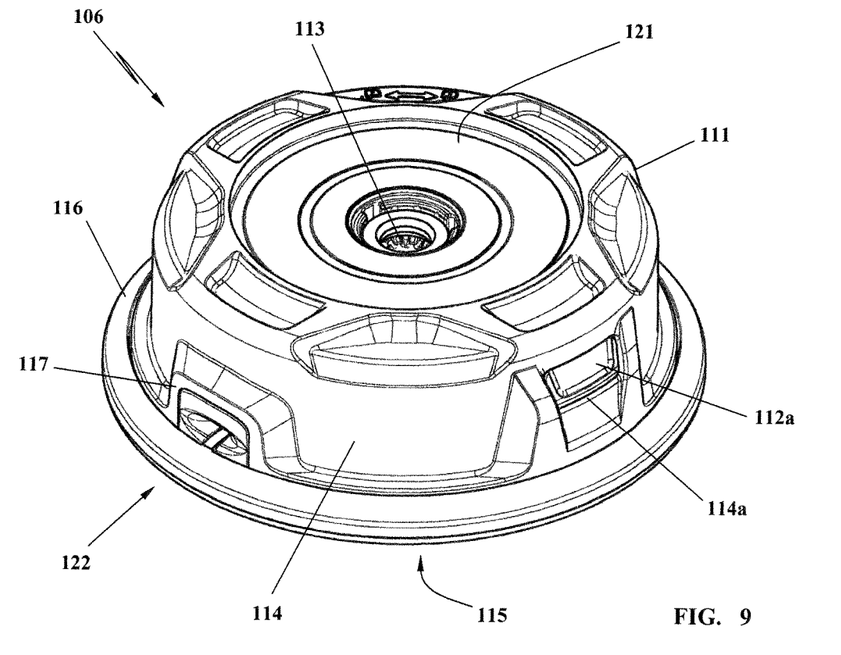
FIG. 9 shows a perspective view of a further embodiment of a filament cutterhead according to the invention.
Figure 10:
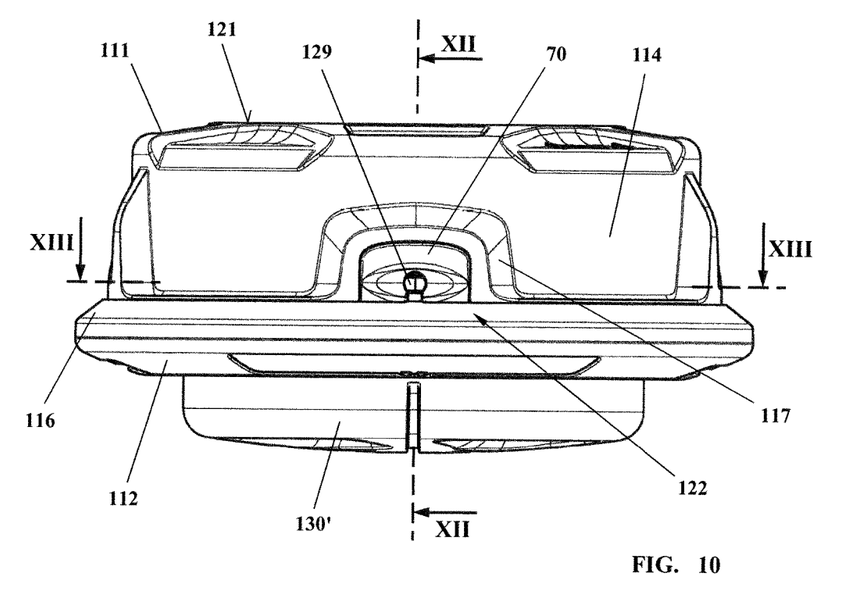
FIG. 10 is a side view of the filament cutterhead according to FIG. 9.
Figure 11:
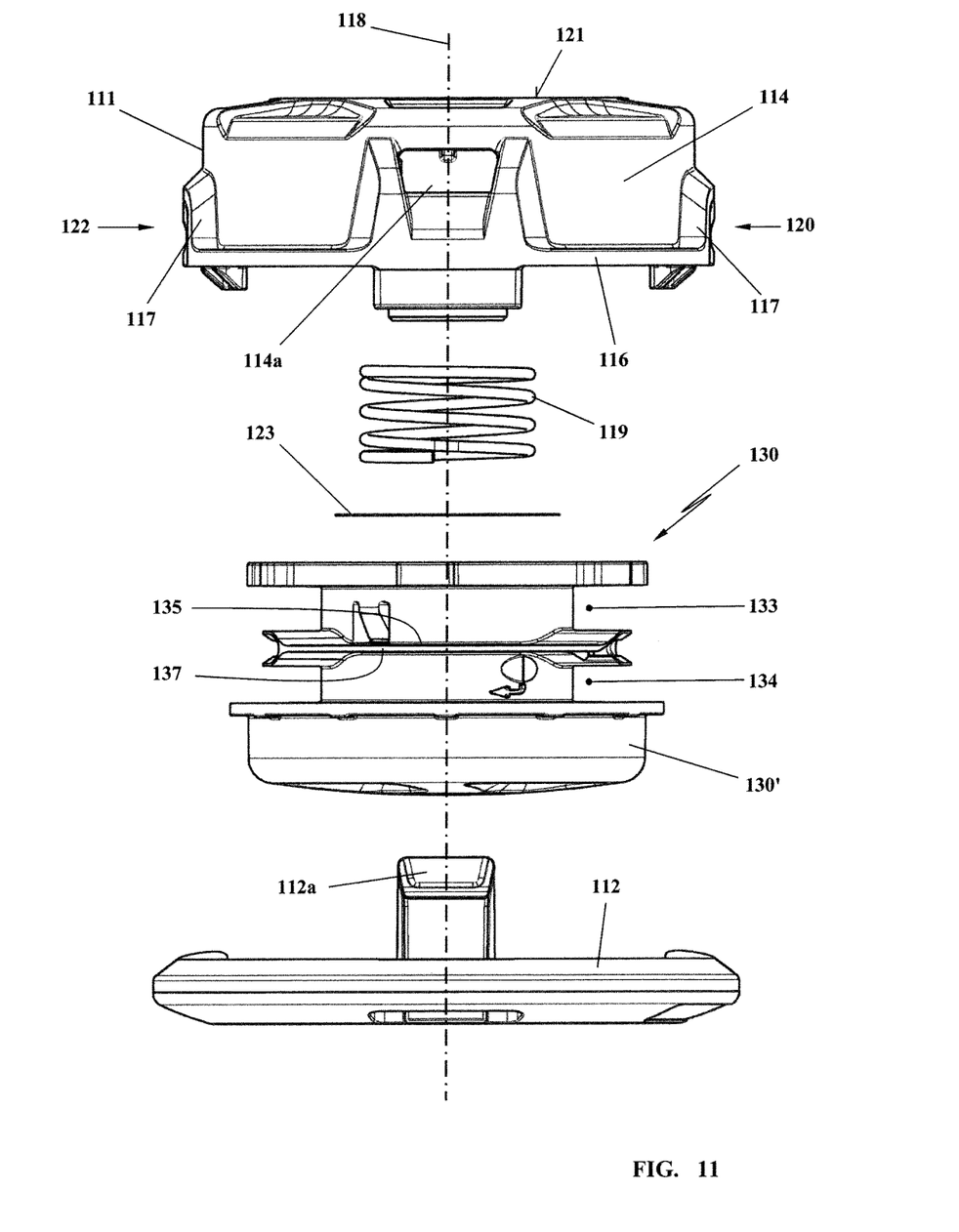
FIG. 11 shows an exploded view of the filament cutterhead according to FIG. 9 with the essential components thereof.

The cup-shaped housing 111 has a base 121 and an outer flange 116. A support contour 117 for protecting the cutting filament is provided in the region of the wall openings (120, 122)—the wall opening 122 is shown in FIG. 9. The opening 115 of the cup-shaped housing 111 is closed by inserting a filament spool 130 having a switching cap 130', wherein the switching cap 130' is held by a closure cover 112 which is secured on the housing 111 via latching elements 112a. In the same manner as in the embodiment according to FIGS. 2 to 8, the filament spool 130 is pressed downward against the closure cover 112 via a helical spring 119 and a pressure disk 123.

Figure 12:
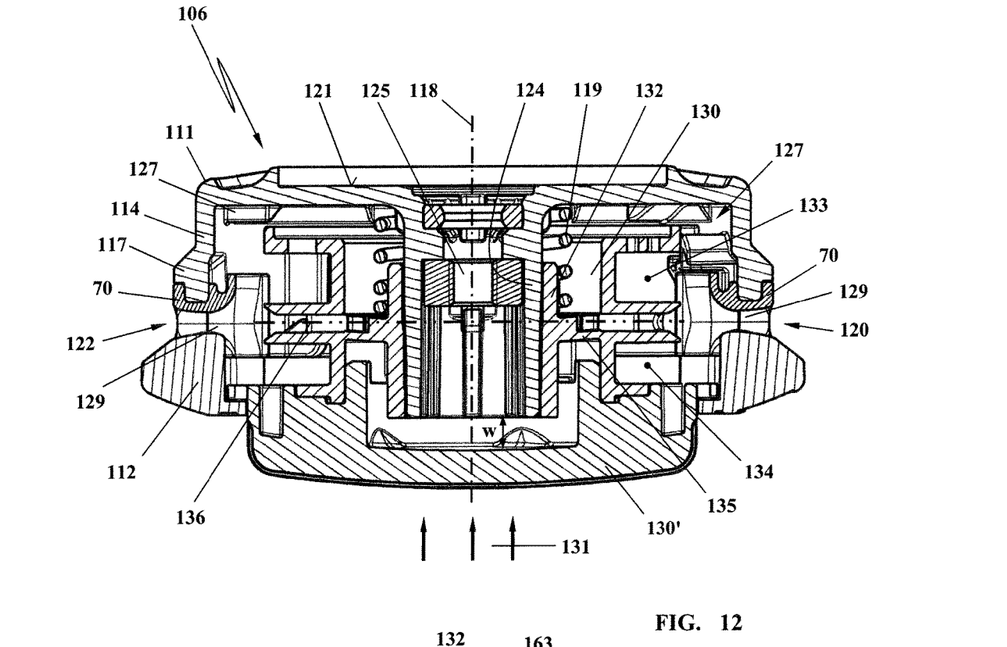
FIG. 12 shows a section along the line XII-XII in FIG. 10.

As is apparent from the sectional illustration according to FIG. 12, a connection sleeve 124 is integrally formed in the center of the base 121, and a fastening nut 125 for threadably engaging the threaded end of a drive shaft 10 (FIG. 1) is provided in the connection sleeve. The connection sleeve 124 engages in the hub 132 of the filament spool 130, the hub having an upper winding section 133 and a lower winding section 134. The winding sections 133 and 134 are separated from each other by a partition wall 135, wherein the partition wall 135 at the same time connects the winding sections 133 and 134 to the hub 132 for rotation therewith.

As in the first embodiment according to FIGS. 2 to 8, the filament spool 130 is displaceable axially counter to the force of the helical spring 119 by a distance (w), as a result of which the driving connection between the driven housing 111 and the filament spool 130 is interrupteded. As a result, the housing 111 rotates more rapidly than the filament spool 130, and therefore a cutting filament protruding out of the wall openings 120 and 122 is unwound further. In order to control the unwinding, an advancing device 127 is formed between the base 121 and the filament spool 130, the advancing device in each case permitting rotations at a predetermined angle of rotation of the relative movement between the housing 111 and the filament spool 130 before the helical spring 119 presses the filament spool 130 again into the operating position according to the illustration in FIG. 12, in which the filament spool 130 is in driving connection with the housing 111.

Figure 13:
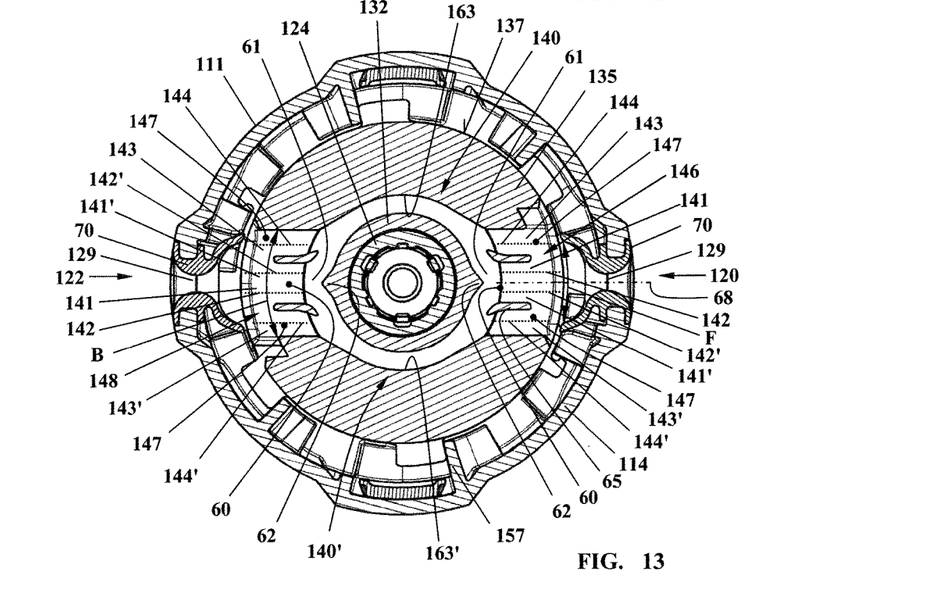
FIG. 13 shows a section along the line XIII-XIII in FIG. 10.

The filament channels 140 and 140' between which the hub 132 of the filament spool 130 lies are clear from the sectional illustration according to FIG. 13.

In a departure from the embodiment of FIGS. 2 to 8, each filament channel (140, 140') has at one and the same wall opening (120, 122), a filament inlet portion 141 or 141', wherein the longitudinal central axis 142 or 142' runs centrally through the wall opening 120 or 122 in the circumferential wall 114 of the housing 111. The filament inlet portion 141 of the first filament channel 140 and the filament inlet portion 141' of the second filament channel 140' form a common central inlet 60 here at a wall opening 120 or 122. The central inlet 60 merges via a channel junction 61 both into the first filament channel 140 on the one side of the hub 132 and into the second filament channel 140' on the other side of the hub 132. A deflector 62 is expediently provided here, the tip of which lies in particular on the longitudinal central axis 68 of the central inlet 60, and a cutting filament pushed through the wall opening 120 or 122 leads either into the filament channel 140 or into the filament channel 140'.

Each filament channel 140 or 140' ends at a wall opening 120 or 122 with a filament outlet portion (143, 143'), wherein—as seen in the circumferential direction in the plane 136 of the partition wall 135—a respective filament outlet portion (143, 143') is provided on both sides of the central inlet 60. The central inlet 60 and the filament outlet portions (143, 143') open in each case into a lateral-guide-free through space 146 or 148.

In the predetermined rotational position of the filament spool 130 in FIG. 13, a cutting filament end portion inserted from the outside through the first wall opening 120 will pass through the through space 146 without guidance, wherein the end of the cutting filament enters the common central inlet 60 of the two guide channels 140 and 140'. On striking against the deflector 62, the guide portion of the cutting filament is directed either into the filament channel 140 or into the filament channel 140'. If the inserted end portion of the cutting filament is guided into the filament channel 140, the end portion will be advanced along the outer wall 163 of the filament channel 140 and will enter the filament outlet portion 143. On further advancing of the cutting filament, the free end will emerge out of the filament outlet portion 143 into the guide-free through space 148 and is guided further in the direction of the wall opening 122 and will emerge through the latter.

In the embodiment shown according to FIG. 13, the width B of the guide-free through space 148 is wider, in particular many times wider than the mouth of the central inlet 60; the width B preferably corresponds to the width, as measured in the circumferential direction in the plane 136 of the partition wall 135, of the mouths 147, located next to each other, of the filament outlet portions (143, 143') and the mouth of the central inlet 60.

If the start of the inserted cutting filament emerges out of the opposite wall opening 122, the user can grasp the cutting filament and can position the latter in such a manner that an approximately identical length of the cutting filament to be wound up protrudes out of the two wall openings (120, 122). The filament spool 130 is then rotated—via the actuating cap 130'—counter to the unwinding direction until the cutting filament is wound up on the winding sections 133 and 134 and only an end portion necessary for the cutting still protrudes from the wall openings 120 and 122.

Figure 14:
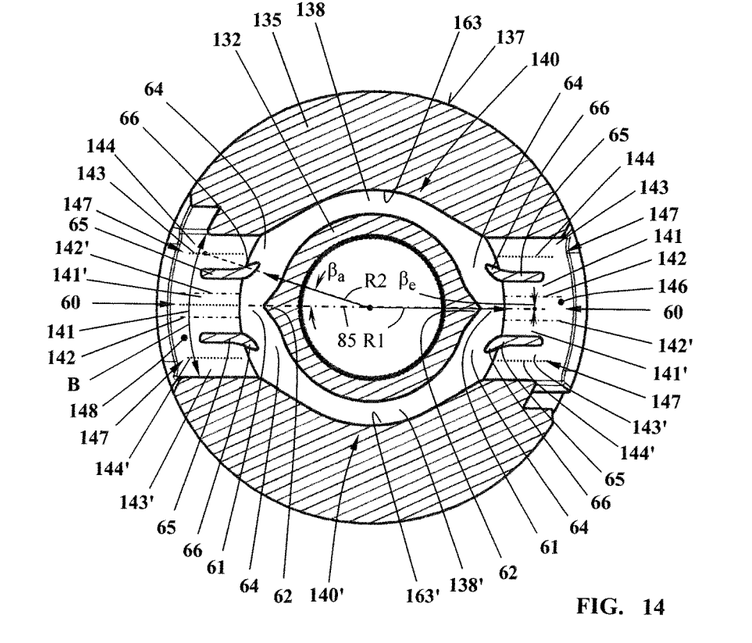
FIG. 14 shows, in an enlarged view, the filament spool according to FIG. 13 illustrated in section.
Figure 15:
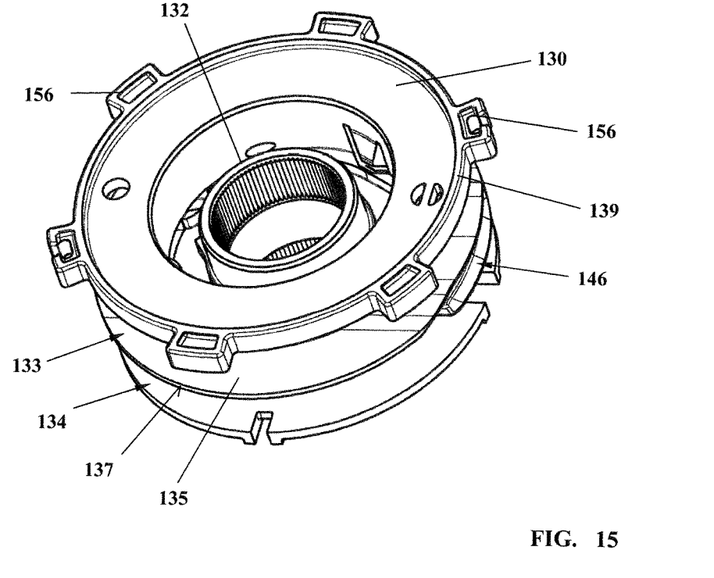
FIG. 15 is a perspective view of the filament spool of the filament cutterhead according to FIG. 12.
Figure 16:
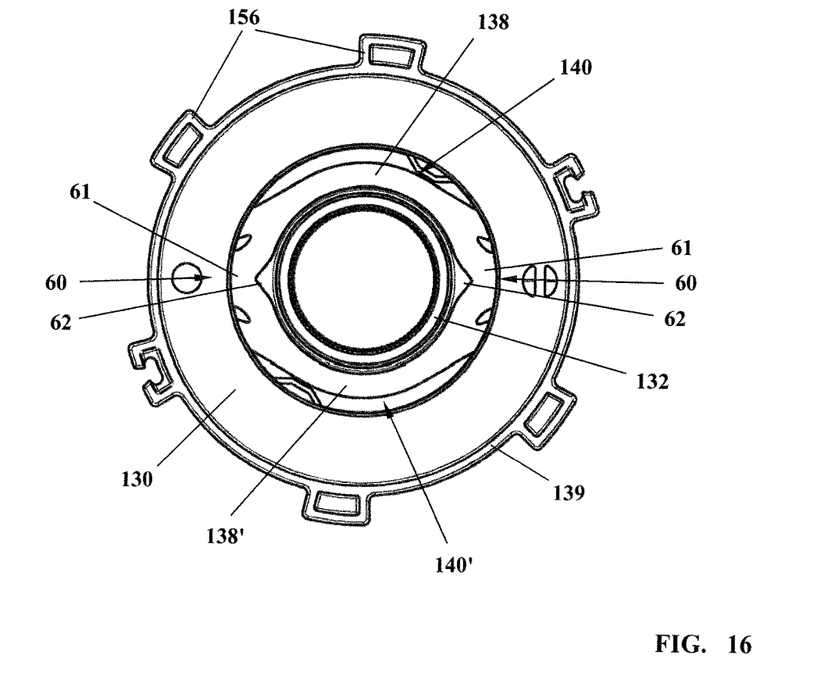
FIG. 16 shows a top view of the filament spool according to FIG. 15.
Figure 17:
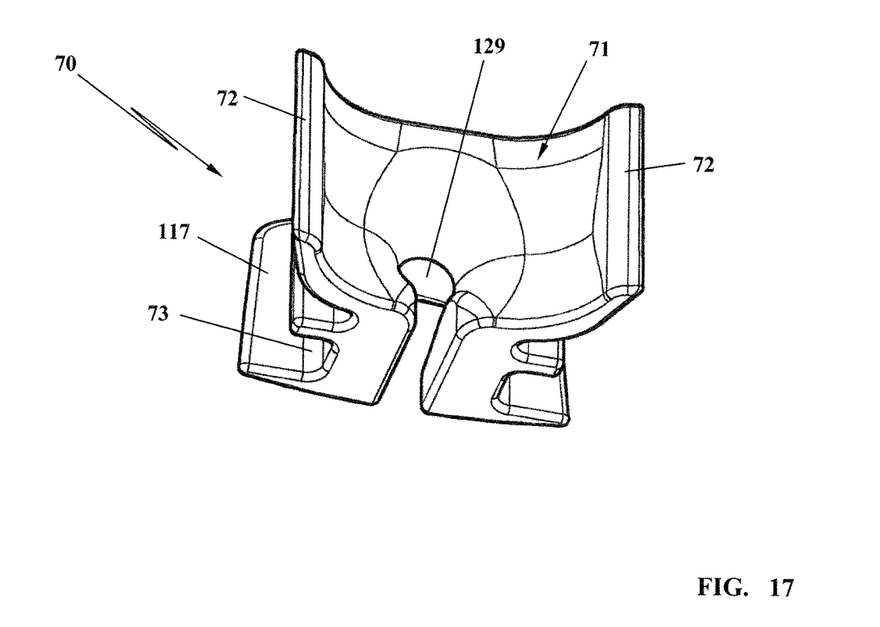
FIG. 17 shows, in a perspective view, a guide bushing for inserting into the wall opening in the circumferential wall of the housing of a filament cutterhead according to FIGS. 12 and 13.
Figure 18:
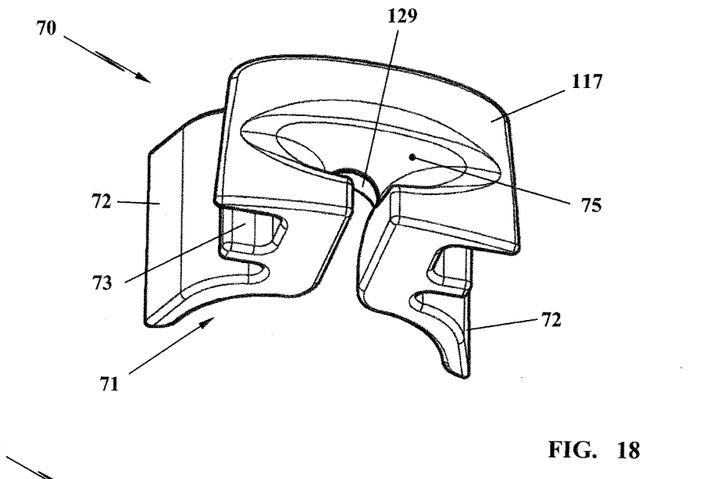
FIG. 18 is a perspective view of the guide bushing from the outside.
Figure 19:
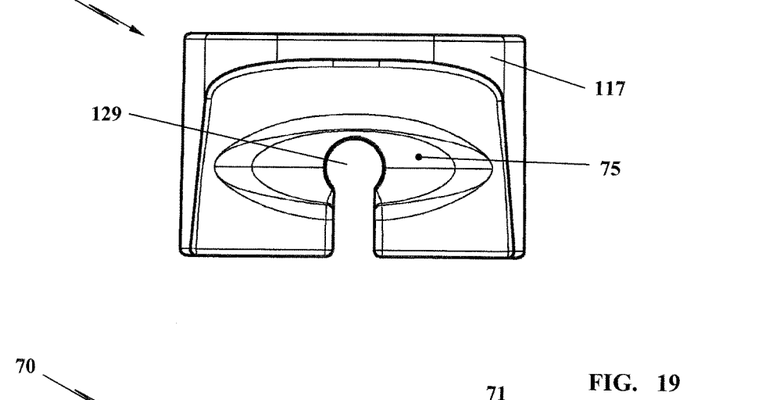
FIG. 19 is a front view of the guide bushing from the outside.
Figure 20:
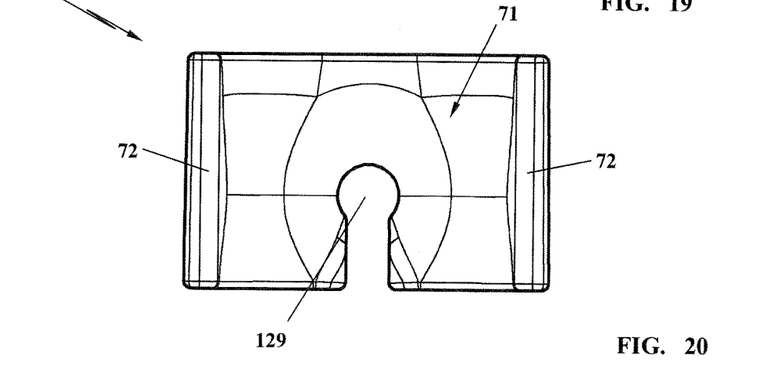
FIG. 20 shows an inside view of the guide bushing from the inside.
Figure 21:
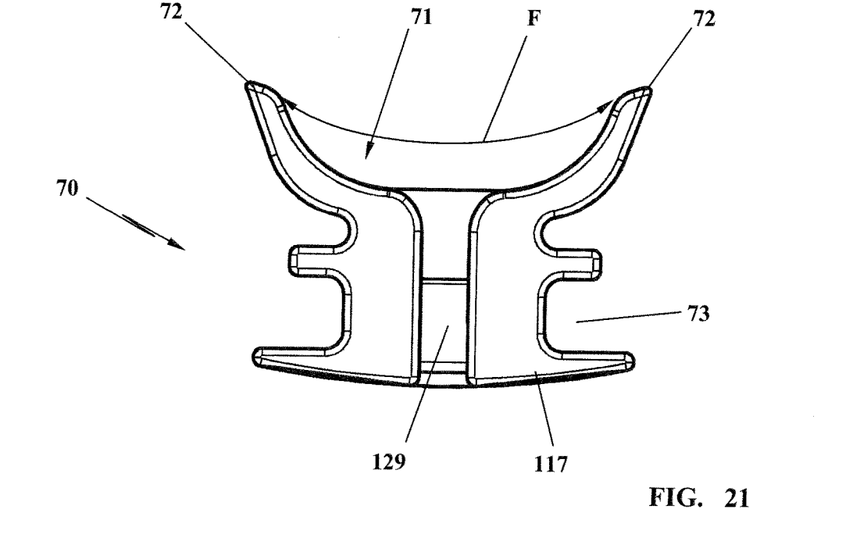
FIG. 21 is a view of the guide bushing from below.

As the sectional illustration of the filament spool in FIG. 14 shows, the central inlet 60 is separated from the filament outlet portions (143, 143') by a partition 65. The inner end 66 of the partition 65, which end faces the filament channel 140 or 140', is oriented approximately tangentially with respect to the curved channel portion 138, and therefore a cutting filament guided on the outer wall 163 of the filament channel (140, 140') is securely caught and guided outward through the filament outlet portion (143, 143'). In addition, the inner end 66 is configured in such a manner that a guiding portion 64 which supports the effect of the deflector 62 is formed between the deflector 62 and the inner partition 65. In a manner corresponding to the illustration in FIG. 7, the filament spool 130 also has carry-along cams 156 on the upper edge 139, via which a driving connection is produced between the driven housing 111 and the filament spool 130.

In a manner corresponding to the description of the embodiment according to FIGS. 7 and 8, the filament channels 140 and 140' are formed as grooves in a flat side of the partition wall 135. The pressure disk 123 shown in FIG. 11 serves to axially close the filament channels (140, 140').

In the embodiment according to FIGS. 9 to 16, guide bushings 70, as reproduced in FIGS. 17 to 22, are provided in the wall openings 120 and 122. The guide bushings 70 are formed with a catch contour 71 on the inner side thereof located radially on the inside, wherein the filament passage opening 129 is provided approximately in the center of the guide bushing 70.

The catch contour 71 is bounded by two longitudinal ribs 72 which extend in the vertical direction of the axis of rotation 118 and extend as far as the edge 137 of the partition wall 135 without touching the latter. The longitudinal ribs 72 have the same function as the inner longitudinal ribs 157 which are formed in the housing 111 and prevent the cutting filament from slipping out from the winding sections (133, 134).

The distance F, as measured in the circumferential direction, of the longitudinal ribs 72 bounding the catch contour 71 corresponds approximately to the width B, which is measured in the same direction (FIG. 13), of the guide-free through space 146 or 148. It is thereby ensured that a cutting filament which emerges from a filament outlet portion (143, 143') is guided in a targeted manner by the catch contour 71 into the filament passage opening 129 and therefore emerges from the wall opening 120 or 122.

The guide bushing 70 is configured in such a manner that the edge of a wall opening (120, 122) is received in a receiving contour 73 of the guide bushing 70; the guide bushing 70, which is preferably composed of metal, is held in a form-fitting manner in the circumferential wall 114 of the housing 111. The outlet contour 75 is configured in a similar manner to an ellipsoid body, wherein the support structure 117 for protecting the cutting filament against breaking off is formed on the guide bushing 70 itself.

Figure 22:
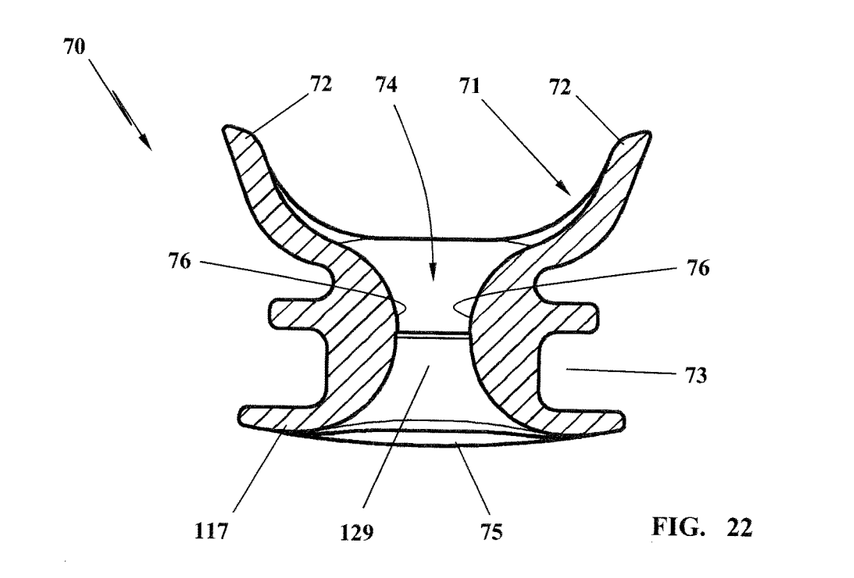
FIG. 22 shows a horizontal section through the guide bushing.

As the sectional illustration in FIG. 22 in particular shows, the filament passage opening 129 is configured as a rounded opening 74, and therefore the cutting filament can bear against the rounded contour 76, as a result of which breaking of the cutting filament in the region of the filament passage opening 129 is avoided.

It is understood that the foregoing description is that of the preferred embodiments of the invention and that various changes and modifications may be made thereto without departing from the spirit and scope of the invention as defined in the appended claims.

What is claimed is:

1. A filament cutterhead for mounting on a drive shaft of a brushcutter, the filament cutterhead comprising:
    a cup-shaped housing defining a peripheral wall having first and second wall openings formed therein for a cutting filament;
    a filament spool for accommodating the cutting filament thereon;
    said filament spool being mounted in said cup-shaped housing so as to be rotatable relative thereto and said filament spool having a hub defining a rotational axis;
    said hub having a disc-shaped partition wall arranged thereon and said disc-shaped partition wall having a maximum outer diameter (A);
    said partition wall partitioning said filament spool into an upper winding section and a lower winding section;
    said partition wall defining a rim and having a filament-guiding filament channel formed therein;
    said filament channel having a filament-guiding filament inlet segment disposed in said rim of said partition wall;
    said filament inlet segment defining a longitudinal center axis lying on a first radius (R1) passing through said rotational axis of said hub;
    said longitudinal center axis of said filament inlet segment defining an imaginary extension thereof which passes through said first wall opening in a pregiven rotational position of said filament spool;
    said filament channel having a filament-guiding filament outlet segment formed in said rim of said partition wall and lying opposite said filament inlet segment;
    said filament channel extending from said filament inlet segment so as to pass by said hub and to said filament outlet segment;
    said filament outlet segment being assigned to said second wall opening;
    said filament outlet segment being at an offset (v) to said longitudinal center axis of said filament inlet segment viewed in the peripheral direction of said hub;
    said filament inlet segment and said filament outlet segment having an inlet mouth and an outlet mouth, respectively;
    said inlet mouth and said outlet mouth being disposed so as to lie within said maximum outer diameter (A) of said partition wall; and,
    filament guiding pass-through spaces being configured to be clear of a filament guide and being formed in said partition wall between corresponding ones of said mouths and said maximum outer diameter (A) of said partition wall.

2. The filament cutterhead of claim 1, wherein at least one of said filament inlet segment and said filament outlet segment is configured as a linear channel segment.

3. The filament cutterhead of claim 1, wherein said partition wall defines a plane and said filament outlet segment defines a longitudinal center axis; and, said longitudinal center axis of said filament inlet segment and said longitudinal center axis of said filament outlet segment are spaced from each other at a distance (a) in said plane of said partition wall.

4. The filament cutterhead of claim 1, wherein:
said inlet mouth and said outlet mouth define respective centers;
said first radius (R1) passes from said rotational axis of said hub through said center of said inlet mouth;
a second radius (R2) passes from said rotational axis of said hub through said center of said outlet mouth;
said first and second wall openings lie on a connecting line passing through said rotational axis of said hub;
said first radius (R1) and said connecting line conjointly define an inlet angle ($\beta_e$);
said second radius (R2) and said connecting line conjointly define an outlet angle ($\beta_a$ and,
said inlet angle ($\beta_e$) and said outlet angle ($\beta_a$) are configured to be unequal.

5. The filament cutterhead of claim 4, wherein said inlet angle ($\beta_e$) is configured to be less than said outlet angle ($\beta_a$).

6. The filament cutterhead of claim 5, wherein said inlet angle ($\beta_e$) is zero.

7. The filament cutterhead of claim 1, wherein at least one of said pass-through spaces is configured to be wider viewed in the peripheral direction of said hub than the width of said inlet mouth and/or said outlet mouth corresponding thereto likewise viewed in said peripheral direction of said hub.

8. The filament cutterhead of claim 1, wherein:
said hub has an inner radius;
said partition wall defines a plane;
said filament channel includes a filament channel segment connecting said filament inlet segment and said filament outlet segment to each other;
said filament channel segment is bent in said plane of said partition wall to form a bent channel segment; and,
said bent channel segment has a bending radius greater than said inner radius of said hub.

9. The filament cutterhead of claim 1, wherein said filament channel is a first filament channel; said filament inlet segment is a first inlet segment and said filament outlet segment is a first outlet segment; and, wherein said filament cutterhead further comprises:
a second filament channel having a second filament inlet segment and a second filament outlet segment;
said second filament channel extending in said partition wall from said second wall opening to said first wall opening; and,
said hub lying between said first and second filament channels.

10. The filament cutterhead of claim 9, wherein said first filament outlet segment and said second filament inlet segment lie ahead of said second wall opening and lie mutually adjacent in the peripheral direction of said partition wall.

11. The filament cutterhead of claim 1, wherein:
said partition wall defines a plane;
in said plane of said partition wall, said filament channel has a filament assist outlet next to said filament inlet segment of said filament channel; and, said filament assist outlet defines a longitudinal center axis parallel to said longitudinal center axis of said filament inlet segment.

12. The filament cutterhead of claim 11, wherein said filament assist outlet is formed by a linear channel segment of said filament channel.

13. The filament cutterhead of claim 12, wherein said filament inlet segment and the channel segment of said filament assist outlet transitions into said filament channel via a common channel widening in said filament channel.

14. The filament cutterhead of claim 9, wherein each of said first and second filament channels has a filament inlet segment at one and the same one of said wall openings; and, the imaginary extension of said longitudinal center axis of the corresponding filament inlet segment passes through said one wall opening.

15. The filament cutterhead of claim 14, wherein said filament inlet segment of said first filament channel and said filament inlet segment of said second filament channel conjointly form a common central inlet ahead of the wall opening corresponding thereto.

16. The filament cutterhead of claim 15, wherein said central inlet transitions into a corresponding one of said filament channels via a channel junction and a deflector.

17. The filament cutterhead of claim 1, wherein guide bushings having respective filament pass-through openings are held in corresponding ones of said wall openings; and, each of said guide bushings has an inner side facing toward said rim of said partition wall and said inner side is configured with a catch contour.

18. The filament cutterhead of claim 17, wherein said catch contour has an opening width (F) which covers over said filament inlet segment and said filament outlet segment.

19. The filament cutterhead of claim 17, wherein said hub defines an upward direction; the catch contour has two longitudinal ribs running in said upward direction; and, said longitudinal ribs project up to ahead of said rim of said partition wall.

20. The filament cutterhead of claim 17, wherein an inner wall of said filament pass-through opening in said guide bushing is configured as a double cone which expands inwardly and outwardly.

* * * * *

UNITED STATES PATENT AND TRADEMARK OFFICE
CERTIFICATE OF CORRECTION

PATENT NO. : 9,826,679 B2
APPLICATION NO. : 14/957251
DATED : November 28, 2017
INVENTOR(S) : S. Lang et al.

It is certified that error appears in the above-identified patent and that said Letters Patent is hereby corrected as shown below:

In the Claims

In Column 13:
Line 26: Claim 4, delete "($\beta_a$" and insert -- ($\beta_a$); -- therefor.

Signed and Sealed this
Twentieth Day of February, 2018

Andrei Iancu
*Director of the United States Patent and Trademark Office*